United States Patent [19]

Toy

[11] 4,400,774
[45] Aug. 23, 1983

[54] CACHE ADDRESSING ARRANGEMENT IN A COMPUTER SYSTEM

[75] Inventor: Wing N. Toy, Glen Ellyn, Ill.

[73] Assignee: Bell Telephone Laboratories, Incorporated, Murray Hill, N.J.

[21] Appl. No.: 230,893

[22] Filed: Feb. 2, 1981

[51] Int. Cl.³ .............................................. G06F 9/06
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,693,165 | 9/1972 | Reiley et al. | 364/200 |
| 3,723,976 | 3/1973 | Alvarez et al. | 364/200 |
| 3,761,881 | 9/1973 | Anderson et al. | 364/200 |
| 3,786,427 | 1/1974 | Schmidt et al. | 364/200 |
| 3,825,904 | 7/1974 | Burk et al. | 364/200 |
| 3,979,726 | 9/1976 | Lange et al. | 364/200 |
| 4,084,230 | 4/1978 | Matick et al. | 364/200 |
| 4,096,573 | 6/1978 | Heller et al. | 364/200 |
| 4,128,875 | 12/1978 | Thurber et al. | 364/200 |

*Primary Examiner*—Harvey E. Springborn
*Attorney, Agent, or Firm*—P. Visserman

[57] ABSTRACT

In a computer system having a cache memory and using virtual addressing, effectiveness of the cache is improved by storing a subset of the least significant real address bits obtained by translation of a previous virtual address and by using this subset in subsequent cache addressing operations. The system functions in the following manner. In order to access a memory location in either the main memory or cache memory, a processor generates and transmits virtual address bits to the memories. The virtual address bits comprise segment, page and word address bits. The word address bits do not have to be translated, but an address translation buffer (ATB) translates the segment and page address into real address bits. A subset of the least significant bits of the latter word address bits represent the address needed for accessing the cache. In order to increase cache memory performance, the cache memory comprises a cache address unit which stores the subset of the real address bits from the ATB. These stored address bits are used in subsequent operations along with the word address bits for accessing the cache memory until the stored address bits no longer equal the current subset of least significant real address bits transmitted from the ATB. When the stored address bits no longer equal the current subset, the cache address unit then stores the current subset; and the cache memory is reaccessed utilizing the word address bits and current subset.

7 Claims, 1 Drawing Figure

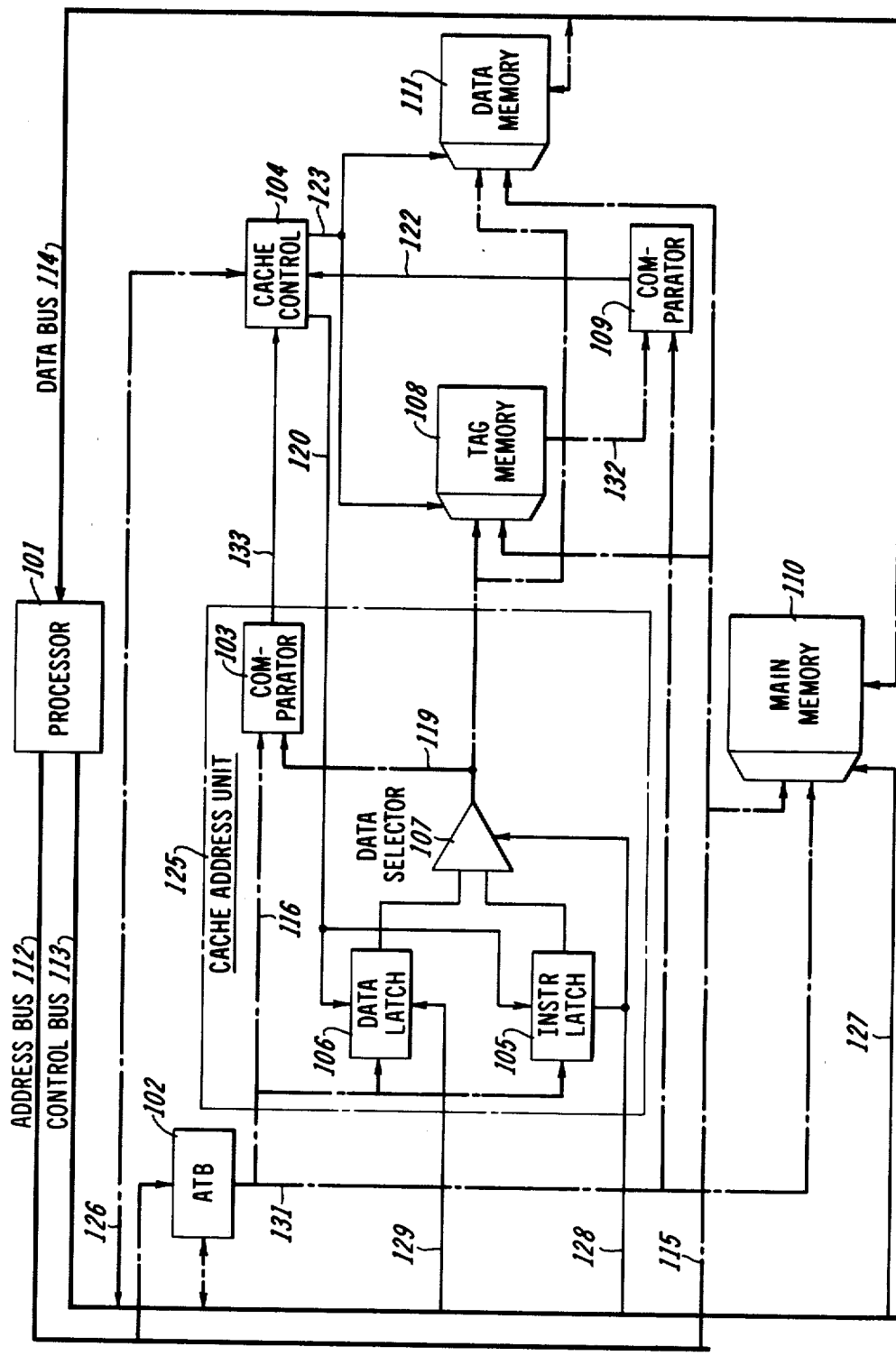

CACHE ADDRESSING ARRANGEMENT IN A COMPUTER SYSTEM

TECHNICAL FIELD

My invention relates to computer systems and particularly to a system comprised of a processor using virtual memory addresses, a cache memory and an address translation buffer for converting virtual addresses into real addresses.

BACKGROUND OF THE INVENTION

Modern computer systems employ processors which are capable of operating at much higher rates of execution than large capacity main memories can support, and a low capacity high-speed cache memory is commonly used in addition to a large capacity main memory to improve program execution speed. The cache memory stores a limited number of instruction or data words; and for each memory read operation, the cache memory is checked to determine if the information is available in the cache memory. If the information is there, it will be read from cache memory; otherwise, it will be read from the main memory. Memory write operations generally cause information to be written simultaneously into the cache and the main memory. The processor normally addresses the main and cache memories using a virtual address defining a relative memory location. A real address defining an actual memory location is derived from the virtual address by an address translation buffer. The most significant bits of the virtual address, which are the segment and page address bits, are translated by the address translation buffer. The least significant address bits of the virtual address, which are the word address bits, are not translated but are directly used by the memory. These word address bits define the page size of the system.

The cache control circuit may use either a purely associative or a set associative technique, to determine if the accessed word is in the cache memory. In a cache memory using the set associative tecnhique, a data memory stores information words (data and instruction words), and a tag memory stores tag address words which define the locations in main memory where corresponding information words are stored. The word address bits define the word to be accessed in both the data and tag memories. When the cache memory is accessed, an information word is read from the data memory and simultaneously a tag address word is read from the tag memory. The tag address word is compared with the real address bits from the address translation buffer to determine if a match has occurred indicating that the information word is the desired word. The occurrence of a match is commonly called a hit, and the hit ratio is the ratio of matches to read operations. The performance is increased by increasing the hit ratio. The performance of a cache memory depends not only on the number of words contained in the cache memory, but also on how the cache memory is structured in comparison to the address translation buffer.

Since the size of both the page and cache memory is determined by the number of word address bits, the number of cache memory words generally equals the number of memory words in a page. A small page size is desirable in order to make the most efficient use of the main memory and the processor in a virtual address environment in which a number of different programs and data sets are simultaneously present in main memory. The smaller page simplifies the problem of allocating memory space between the different programs and data sets and this results in less processor time being used for this operation. Memory is used more efficiently because the smaller page size allows the memory space allocated to more closely approximate the amount required in each memory allocation operation. In a cache memory, it is also desirable to have the maximum number of cache memory words in order to achieve a high-hit ratio per memory access. In addition, a cache memory organization having a large number of words takes advantage of high density memory chips which are organized to have a large number of words, but have a small number of bits per word. Hence, the requirement that the page size equal the cache memory size results in an inefficient design with respect to either the page or cache memory size or both.

SUMMARY OF THE INVENTION

Advantageously, in a computer system in accordance with the present invention, the cache memory size is expanded; and the page size and the cache memory size do not have to be equal. The tag and data memory are accessed by the word address bits and stored address bits which a memory access control circuit generates by storing the least significant real address bits from a previous access to the cache memory. Hence, the page size is determined by the word address bits, but the size of the cache memory is determined by the word address bits and the least significant real address bits.

In the embodiment of the invention, a processor generates virtual address signals, including word address signals, and a read control signal; and an address translation buffer (ATB) responds to the virtual address signals, with the exception of the word address signals, to generate real address signals. The real address signals are comprised of cache address signals, also called the least significant real address signals, and remaining real address signals. In response to the read control signal, the memory access control circuit transmits the stored address signals and a first cache control signal to the cache memory. The memory access control circuit is comprised of a cache control circuit and cache address unit. The cache memory is responsive to the first cache control signal, word address signals, and stored address signals to read a data word from the cache memory. A comparator compares the stored address signals with the cache address signals from the ATB. If the two sets of addresses are equal, the comparator generates a first compare signal; but if the two sets of addresses are not equal, the comparator generates a second compare signal.

Advantageously, the cache control circuit is responsive to the first compare signal to transmit a completion signal to the processor. The cache control circuit is responsive to the second compare signal to generate a second cache control signal. In response to the second cache control signal, the cache address unit stores the cache address signals internally as the stored address signals, and transmits the stored address signals to the cache memory. The cache memory is responsive to the second cache control signal, the contents of the cache address unit, and the word address signals to read a different cache data word and transmit this cache data word to the processor.

Additionally, the cache address unit comprises a first register for storing cache address signals associated with an instruction read operation which is designated by the processor transmitting an instruction signal, and a second register for storing cache address signals associated with a data word read operation which is designated by the processor transmitting a data signal. A data selector responds to the instruction signal to select the contents of the first register and responds to the data signal to select the contents of the second register for transmission to the cache memory.

Further, the first register responds to the second control signal and the instruction signal to store the cache address signals internally as the stored address signals, and the second register responds to the second control signal and the data signal to store the cache address signals internally as the stored address bits.

Advantageously, the cache memory may be comprised of a tag memory, a cache comparator circuit, and a data memory. The tag memory and data memory are responsive to the first or second cache control signals, word address signals, and stored address signals to read a tag data word and a cache data word, respectively. The cache comparator circuit compares the remaining real address signals and the tag data word; and if a match occurs, the cache comparator circuit transmits to the cache control circuit a third compare signal; and if a match doesn't occur, the cache comparator circuit transmits to the cache control circuit a fourth compare signal. In response to the third compare signal, cache control circuit transmits the completion signal to the processor.

Further, the cache control circuit is responsive to the fourth compare signal to inhibit the transmission of the completion signal generated in response to the first compare signal.

The cache control circuit is further responsive to the second compare signal to inhibit the transmission of the completion signal generated in response to the third compare signal.

BRIEF DESCRIPTION OF THE DRAWING

The invention will be better understood from the following detailed description when read with reference to the drawing showing an illustrative computer system in accordance with this invention in block diagram form.

DETAILED DESCRIPTION

In a computer system as illustrated in the drawing, data and instruction words are stored in memory locations of main memory 110 and a cache memory. The cache memory is comprised of cache address unit 125, comparator 109, tag memory 108, data memory 111, and cache control 104. Processor 101 accesses these memory locations by transmitting a virtual address via address bus 112, and control signals via control bus 113.

The virtual address transmitted by processor 101 must be translated into a real address which defines a physical memory location; then the real address is utilized by main memory 110 or data memory 111. The virtual address is composed of segment, page, and word address bits. The segment address bits designate which segment of the memory is to be accessed, and the page address bits designate which page of the memory within the segment is to be accessed. The segment and page address bits of the virtual address are translated by address translation buffer (ATB) 102. The word address bits designate the word within the page which is to be accessed; and these bits do not have to be translated, since the word address bits can be used directly by either main memory 110 or data memory 111.

A cache memory implemented by elements similar to cache control 104, tag memory 108, comparator 109, and data memory 111 is well known in the art, and an example of such a memory is detailed in U.S. Pat. No. 4,197,590 of S. J. Chang and W. N. Toy. In such systems, the word accessed by the tag memory is the address tag which defines at what address location in main memory the word currently being accessed in the data memory is stored. The word accessed by the data memory is the correct word requested by the processor if the address tag equals the real address generted by the ATB. In these systems, only the word address bits are used to address the tag and data memories. In the present system, the cache address unit expands the address space of the cache memory over that of the prior art system by storing the two least significant bits of the real address (cache address bits) and by attempting to reuse these bits in subsequent read operations. When processor 101 performs a read operation, the cache memory is accessed using the word address bits and previously stored cache address bits; and simultaneously ATB 102 performs the virtual to real address translation. If the stored address bits do not equal the two least significant bits of the real address, the cache address unit stores these two least significant bits and reaccesses the cache memory with these bits. If the stored address bits equal the two least significant bits of the real address, the tag address and remaining real address bits are compared to determine if the word actually requested has been accessed by data memory 111. Cache address unit 125 stores the cache address bits for the last instruction read operation in instruction latch 105 and for the last data read operation in data latch 106. The contents of instruction latch 105 is re-used for instruction accesses, and the contents of the data latch 106 are re-used for data accesses.

When processor 101 reads memory to obtain an instruction word, it transmits a virtual address via address bus 112, and control signals via control bus 113. The control signals are the read request signal and the instruction signal. In response to the virtual address and the read request signal, ATB 102 starts the virtual to real address translation; and simultaneously, in response to the read request signal, cache control 104 transmits the enable signal via conductor 123 to tag memory 108 and data memory 111. The tag memory 108 and the data memory 111 respond to the enable signal by starting to access memory words which are defined by the address bits transmitted on bus 115 by processor 101 and the address bits transmitted on bus 119 by data selector 107. In response to the instruction signal, data selector 107 selects and transmits the contents of instruction latch 105 on bus 119 as address bits. When ATB 102 has completed the virtual to real address translation, it transmits the real address via bus 131 to comparator 109; concurrently, when tag memory 108 has finished accessing the address tag word, it transmits this word to comparator 109 via bus 132. If the address tag word equals the real address, comparator 109 transmits the tag match signal to cache control 104 via conductor 122 which indicates that data memory 111 has accessed the correct memory word.

Simultaneously, with the comparison being performed by comparator 109, comparator 103 compares the stored address bits being transmitted via bus 119 with the two least significant real address bits being transmitted via bus 116. If the address bits on bus 116 equal the address bits on bus 119, the stored address bits are the correct bits; and comparator 103 transmits the cache match signal to cache control 104 via conductor 133. If cache control 104 receives the cache match signal from comparator 103 and the tag match signal from comparator 109, it transmits the memory completion signal to processor 101 via bus 126 and continues to transmit the enable signal to the tag and data memories. Data memory 111 responds to the enable signal by transmitting the accessed memory word via data bus 114 to processor 101. In response to the memory completion signal, processor 101 stores internally the memory word being transmitted via data bus 114.

If a mismatch is indicated by comparator 109, the instruction word accessed by data memory 111 was not actually requested by processor 101, and comparator 109 will not transmit the tag match signal to cache control 104. Consequently, cache control 104 will not transmit the memory completion signal and will stop transmitting the enable signal. If this occurs, cache control 104 must access the desired memory word from main memory 110, as described in the above-noted Chang patent. Cache control 104 stores this memory word in data memory 111 and stores the proper tag address in tag memory 108. While this operation is being performed, main memory 110 also transmits the memory word to processor 101 via data bus 114 in response to a control signal transmitted from cache control 104 via control bus 113.

If a mismatch is indicated by comparator 103, the stored address bits transmitted via bus 119 were not the correct bits, and comparator 103 will not transmit the cache match signal to cache control 104. Consequently, cache control 104 will not transmit the memory completion signal. When such a mismatch occurs the two least significant bits of the real address being transmitted on bus 116 must be stored into instruction latch 105. Cache control 104 pulses conductor 120 which loads instruction latch 105 since the instruction signal enables this latch and is being transmitted by processor 101. Once instruction latch 105 has been loaded with the two least significant bits of the real address, they will be used to access tag memory 108 and data memory 111 as described earlier. After tag memory 108 and data memory 111 finish accessing, comparator 109 compares the address tag word with the real address bits to determine if data memory 111 has accessed the correct word. The steps to be taken by cache control 104 subsequent to the comparison by comparator 109, have been described in the previous paragraph.

When processor 101 reads memory to obtain a data word, it transmits a virtual address via address bus 112 and a read request signal and a data signal via control bus 113. The cache memory's response is similar to an instruction read operation except that data latch 106 is used rather than instruction latch 105.

It is to be understood that the above-described arrangement is merely an illustrative application of the principles of the invention; numerous other arrangements may be devised by those skilled in the art without departing from the spirit and scope of the invention.

What is claimed is:

1. A computer system comprising:
    a processor for generating and transmitting read control signals and virtual address signals including word address signals;
    cache memory means having a plurality of word locations;
    address translation means responsive to certain of said virtual address signals for generating present cache address signals and other address signals;
    memory access control means comprising address storage means for storing previous cache address signals and cache control means responsive to said read control signals to transmit a first cache control signal and the stored previous cache address signals to said cache memory;
    said cache memory means being responsive to said first cache control signal, said stored address signals, and said word address signals to read a first one of said plurality of word locations for transmitting the contents of said first one of said plurality of word locations to said processor;
    said memory access control means further comprising comparator means for comparing said stored address signals and said present cache address signals to generate a first compare signal if said stored address signals equal said present cache address signals and to generate a second compare signal if said stored address signals are not equal to said present cache address signals;
    said cache control means being responsive to said first compare signal to generate and to transmit a completion signal to said processor and responsive to said second compare signal to generate a second cache control signal.

2. A computer system in accordance with claim 1 wherein said address storage means comprises means responsive to said second cache control signal to store said present cache address signals as a new set of previous cache address signals and to transmit said present cache address signals to said cache memory;
    said cache memory means is further responsive to said second cache control signal, said transmitted present cache address signals, and said word address signals to read a second one of said plurality of word locations for transmitting the contents of said second one of said plurality of word locations to said processor.

3. A computer system in accordance with claim 2 wherein said read control signals comprise an instruction signal and a data signal;
    said stored previous cache address signals comprise instruction address signals and data address signals;
    said address storage means further comprises a first register means for storing said instruction address signals, a second register means for storing said data address signals, and selector means responsive to said instruction signal for transmitting said stored instruction address signals to said cache memory means;
    said cache memory further being responsive to said first cache control signal, the transmitted instruction address signals, and said word address signals to read a third one of said plurality of word locations for transmitting the contents of said third one of said plurality of word locations to said processor;
    said selector means further responsive to said data signal for transmitting said stored data address signals to said cache memory; and
    said cache memory further being responsive to said first cache control signal, the transmitted data address signals, and said word address signals to read a fourth one of said plurality of word locations for transmitting the contents of said fourth one of said plurality of word locations to said processor.

4. A computer system in accordance with claim 3 wherein said first register means is responsive to said second cache control signal and said instruction signal to store said present cache address signals as a new set of instruction address signals; and said second register means is responsive to second cache control signal and said data signal to store said present cache address signals as a new set of data address signals.

5. A computer system comprising a processor for generating and transmitting a read control signal and virtual address signals including word address signals;

address translation means responsive to certain of said virtual address signals for generating present cache address signals and other address signals;

cache memory means comprising tag memory means for storing tag data words, and data memory means for storing information data words;

memory access control means comprising address storage means for storing previous cache address signals and cache control means responsive to said read control signal to transmit a first cache control signal and the stored previous cache address signals to said cache memory;

said memory access control means further comprising comparator means for comparing said stored address signals and said present cache address signals to generate a first comparison signal if said stored address signals equal said present cache address signals and to generate a second compare signal if said stored address signals are not equal to said present cache address signals;

said tag memory and said data memory being responsive to said first cache control signal, said stored address signals, and said word address signals to read a tag data word and an information data word, respectively;

cache address comparison means responsive to said other address signals and said tag data word to generate and to transmit to said cache control means a third compare signal if said other address signals equal said tag data word and to generate a fourth compare signal if said other address signals do not equal said tag data word; and said cache control means is responsive to concurrent generation of said first and said third compare signals to generate and to transmit said completion signal to said processor.

6. A computer system in accordance with claim 5 wherein said cache control means is responsive to said second compare signal to inhibit the transmission of said completion signal to said processor in response to said third compare signal.

7. A computer system in accordance with claim 6 characterized in that said cache control means is responsive to said fourth compare signal to inhibit the transmission of said completion signal to said processor in response to said first compare signal.

* * * * *